United States Patent [19]
Kindt et al.

[11] Patent Number: 6,162,288
[45] Date of Patent: *Dec. 19, 2000

[54] SPRAYABLE FIREPROOFING COMPOSITION

[75] Inventors: Lawrence J. Kindt, Sykesville, Md.; Dennis M. Hilton, Nashua, N.H.; Richard P. Perito, Malden, Mass.

[73] Assignee: W. R. Grace & Co.-Conn., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/314,707

[22] Filed: May 19, 1999

[51] Int. Cl.[7] .................................................. C09K 21/00
[52] U.S. Cl. ..................... 106/18.11; 106/18.14; 106/680; 106/735; 106/773; 106/774; 106/776; 106/778; 252/601
[58] Field of Search ............... 106/18.11, 18.14, 106/778, 776, 773, 774, 680, 735; 252/601

[56] References Cited

U.S. PATENT DOCUMENTS

| | | | |
|---|---|---|---|
| 4,670,055 | 6/1987 | Koslowski | 106/677 |
| 4,751,024 | 6/1988 | Shu et al. | 252/601 |
| 4,904,503 | 2/1990 | Hilton et al. | 427/373 |
| 4,934,596 | 6/1990 | Hilton et al. | 239/8 |
| 5,034,160 | 7/1991 | Kindt et al. | 252/604 |
| 5,203,919 | 4/1993 | Bobrowski et al. | 106/802 |
| 5,340,612 | 8/1994 | Perito | 427/403 |
| 5,401,538 | 3/1995 | Perito | 427/403 |
| 5,413,819 | 5/1995 | Drs | 427/427 |
| 5,427,617 | 6/1995 | Bobrowski et al. | 106/802 |
| 5,520,332 | 5/1996 | Gaidis et al. | 239/8 |
| 5,556,578 | 9/1996 | Berneburg et al. | 252/604 |

FOREIGN PATENT DOCUMENTS 5-50411  3/1993  Japan.

OTHER PUBLICATIONS

Standard Test Methods for Physical Testing of Gypsum, Gypsum Plasters and Gypsum Concrete, published, 1993 (American Society for Testing and Materials), Designation: C 472–93, pp. 1–8. (no month).

Derwent Abstract No. 1970–25567R, abstract of Japanese Patent Specification No. 70–009657 (1970) (no month).

Derwent Abstract No. 1996–138030, abstract of Russian Patent Specification No. 2039721 (Jul. 1995).

*Primary Examiner*—Anthony Green
*Attorney, Agent, or Firm*—Craig K. Leon; William L. Baker

[57] ABSTRACT

Improved sprayable gypsum-based fireproofing composition comprising a lightweight aggregate and a set retarding agent in an amount effective to delay the setting of said composition for at least 24 hours and preferably for at least 72–96 hours without causing the composition to swell or shrink or to cause a salt layer to form on the composition when it is spray-applied. The fireproofing composition can retain fluidity in conventional spray hoses overnight and yet is capable of being injected with a set accelerator, such as aluminum sulfate, on the next day or on a successive day when spray-applied onto a substrate.

38 Claims, No Drawings

SPRAYABLE FIREPROOFING COMPOSITION

FIELD OF THE INVENTION

The present invention relates to a spray-applicable, gypsum-based fireproofing composition having a certain set retarding agent in amount sufficient to delay the setting of the composition for at least 24 hours, and preferably at least 72 hours, which composition can nevertheless be spray-applied in combination with a set accelerator and provide an effective fireproofing composition, one that is pumpable and spray-applicable with excellent hangability and yield.

Exemplary novel compositions of the invention employ a gypsum-based binder and a set retarder, comprising a hydroxycarboxylic acid, a polycarboxylic acid, a phosphoric acid, or their salt or derivative, in an amount sufficient to delay the setting of the fireproofing composition for at least 24 hours and preferably for up to 72–96 hours or more. Another exemplary novel composition of the invention comprises the use of a gypsum-based binder and proteinaceous set retarder in an amount of 0.4–7.5% based on the weight of binder in the fireproofing composition, whereby setting is delayed for at least 24 hours.

The invention also pertains to a method wherein a retarding agent is used for rendering the gypsum-based fireproofing composition in a fluid state overnight in the spray equipment while retaining spray-applicability with an injectable set accelerator, such as aluminum sulfate, on a subsequent day.

BACKGROUND OF THE INVENTION

It is well known to spray apply fireproofing slurries to metal structural members and other building surfaces in order to provide a heat resistant coating thereon. U.S. Pat. Nos. 3,719,513 and 3,839,059, which are incorporated herein by reference, disclosed gypsum-based formulations that contain, in addition to the gypsum binder, a lightweight inorganic aggregate such as vermiculite, a fibrous substance such as cellulose, and an air entraining agent.

U.S. Pat. No. 4,751,024, which is incorporated herein by reference, disclosed sprayable fireproofing compositions containing shredded polystyrene as a lightweight aggregate in fireproofing compositions.

Since fireproofing compositions are typically transported to the building site as dry mixtures, and are formed into slurries upon the addition of an appropriate amount of water, the preparation and application processes may span many hours. Thus, the setting time of the mix is generally heavily retarded to provide an acceptable field pot life. This retarding in the mixer contradicts the desired quick setting time upon spray application; it is highly desirable to achieve quick setting time in the composition upon spray-application to provide body to the fireproofing. Accordingly, a delicate balance between the use of retarding agents and accelerating agents is desirable and yet difficult to achieve. Obviously, if the mixture were to stiffen substantially in the hopper or mixer, it would be rendered non-pumpable and therefore would be useless for the intended application.

Such fireproofing slurries are generally prepared at ground level and pumped to the point of application, where they are spray-applied onto the substrate. Often, the point of application exceeds twenty or thirty stories where high rise construction is involved. U.S. Pat. Nos. 4,934,596 and 5,520,332, which are incorporated herein by reference, each disclose a method and apparatus which may be used for spray-application of fireproofing compositions through hoses and nozzles. An accelerator fluid is introduced by injection and distributed evenly within the flowing slurry to accelerate the setting of the spray-applied fireproofing composition upon application.

The inclusion of set retarding agents and set accelerating agents in sprayable fireproofing slurries is therefore not a matter of casual or intuitive selection. The formulation and preparation of such fireproofing slurries is complicated by the fact that pumpability is a critical characteristic: the formulated compositions must be able to hold the large quantity of water that renders them capable of being pumped easily and to great heights, yet they must retain a consistency sufficient to prevent segregation or settling of ingredients and permit adequate yield or coverage of the substrate at a given thickness. The compositions must be able to entrain air of a stable nature in order to be pumped through conventional fireproofing spray equipment. The coating mixes must adhere to the substrate both in the slurried state and in the dry state. Also, the mix must set without undue expansion or shrinkage which could result in the formation of cracks that would seriously deter from the insulative value of the dry coating.

Typically, the spray equipment, which includes the mixer, pump, hoses, nozzle, and other ancillary equipment, needs to be pumped clean with water at the end of an application job, to ensure that the sprayable composition does not have the opportunity to harden and plug up the equipment overnight. Thus, at the end of every work day, the applicators needed to take time to empty and clean their equipment. Moreover, the unused slurry, which is pumped out of the mixer and hoses, also becomes an environmental concern. Thus, current fireproofing formulations lead to the loss of production time and creation of waste. Current pumpable fireproofing slurries incorporate a protein-based material (e.g., horse hooves), in amounts of 0.2–0.25% based on weight of binder in the composition, which retards the setting of the slurry for approximately four to twelve hours.

Until the present invention, however, it has not been taught or suggested in the fireproofing industry to achieve a gypsum-based fireproofing composition for spray-application which is capable of delayed setting for at least 24 hours and up to 72–96 hours. The present inventors had privately surmised among themselves that protein-based set retarders could be used in an amount sufficient to delay the setting of the fireproofing composition overnight (e.g., sixteen to twenty-four hours) or over the weekend, and that the high level of proteinaceous set retarder would generate an extremely unpleasant odor. Moreover, where aesthetics are important, high amounts of such protein-containing set retarders may have detrimental effects in terms of staining the fireproofing coating that is applied and allowed to set in place.

However, it was not until internal testing was completed—as set forth hereinafter—that the inventors realized how inventive their earlier private surmisings about using delayed-set retarding agents, without destroying the fireproofing abilities of the gypsum-based fireproofing composition, was.

SUMMARY OF THE INVENTION

In surmounting the disadvantages of the prior art, the present invention provides an improved gypsum-based fireproofing composition which is capable, when combined with water to form a sprayable slurry, of maintaining its fluidity in conventional spray equipment overnight (or the weekend), and nevertheless maintaining spray-applicability (as described in the background above) when used with an injected set accelerator on a subsequent day. Thus, this invention pertains to fireproofing compositions and methods involving "delayed-set" capabilities during spray application operations.

An exemplary fireproofing composition of the present invention comprises a gypsum-based binder; at least one lightweight aggregate having a bulk density of 0.4–10 pounds per cubic foot (6.4–160 kg/cubic meter); and further comprising (a) a synthetic set retarding agent selected from a hydroxycarboxylic acid or a salt or derivative thereof, a polycarboxylic acid or a salt or derivative thereof, or a phosphoric acid or salt or derivative thereof; or (b) a proteinaceous set retarding agent in the amount of at least 0.4%, and more preferably in the range of 0.4–7.5% (and most preferably 0.5–5.0%), based on the dry weight of total binder in the fireproofing composition (35–150° F.).

A preferred set retarding agent comprises sodium polyacrylate, which forms a polyacrylic acid when placed into the aqueous slurry environment of the fireproofing composition (usually supplied in powder form having binder and aggregates that are then mixed with water). Preferably, sodium polyacrylate is used in an amount of at least 0.25–4.5% based on total dry weight of the binder component in the fireproofing composition.

An exemplary method for retarding the setting of a gypsum-based fireproofing composition, comprises incorporating into the composition at least one lightweight aggregate having a bulk density of 0.4–10.0 pounds per cubic foot (6.4–160 kg/cubic meter) and a set retarding agent comprising: (a) a synthetic set retarding agent selected from a hydroxycarboxylic acid or a salt or derivative thereof, a polycarboxylic acid or a salt or derivative thereof, or a phosphoric acid or salt or derivative thereof; or (b) a proteinaceous set retarding agent in the amount of at least 0.4%, and more preferably in the range of 0.4–7.5% (and most preferably 0.4–4.0%), based on the dry weight of total binder in the fireproofing composition (for typical fireproofing spray-application temperatures in the range of 35–150° F.).

The novelty and inventiveness of the present invention can be shown in that the particularly described set retarding agents may be used in conventional gypsum-based fireproofing compositions using conventional spray equipment and processes as described, for example, in U.S. Pat. Nos. 4,904,503; 4,934,596; or 5,520,332, which are incorporated by reference herein.

An exemplary fireproofing method comprises (a) spray applying through a mixer and hose a first gypsum-based fireproofing composition comprising a proteinaceous set retarding agent wherein this set retarding agent is used in an amount well below 0.4% based on dry weight of binder component; and (b) subsequently introducing into the same mixer and same hose a second gypsum-based fireproofing composition comprising (a) a synthetic set retarding agent selected from a hydroxycarboxylic acid or a salt or derivative thereof, a polycarboxylic acid or a salt or derivative thereof, or a phosphoric acid or salt or derivative thereof; or (b) a proteinaceous set retarding agent in the amount of 0.4–7.5% (more preferably 0.4–4.0%) based on the dry weight of binder in the composition.

The second gypsum-based fireproofing composition can optionally contain a colorant, dye, or pigment to enable the operator to distinguish visually between the two fireproofing compositions, and the operator can therefore confirm visually when the second composition completely fills the spray equipment so that it would then be safe to shut down overnight or over the weekend as the case may be. On a subsequent day, the operator can then resume spray-application using an injected set accelerator, and can optionally revert to the first fireproofing composition (having lower level set retarding agent). Further features and advantages of the invention are described in detail hereinafter.

DETAILED DESCRIPTION OF EXEMPLARY EMBODIMENTS

Unless otherwise indicated, all percentages and proportions given herein are by weight, based on the total weight of solids in the dry (powder) mix which is used to prepare the fireproofing slurry. The invention therefore pertains to the composition when it is in dry powder form (to which water can be added to provide the slurry) as well as to the slurry form which is obtained by adding water at the application site (to obtain a slurry which is effectively pumpable and spray-applicable in the manner of hydratable gypsum-based fireproofing).

As used herein, the term "gypsum-based fireproofing composition" means a composition (either in dry or slurry form) which comprises gypsum as the primary binder (e.g., comprising at least 51% by weight, and more preferably at least 80% by weight, of the binder component or constituent in the total fireproofing composition), and which, in slurry form, can be spray-applied through pumps, hoses, and nozzle using conventional spray-application equipment onto a metal structural member or substrate (e.g., steel beam or panel) and to provide insulative protection against fire and heat. The protection of the metal structural member is usually manifested under high heat conditions by a substantial decrease in the tendency of the metal to buckle or warp.

By the term "gypsum" is meant both non-hydrated and hydrated Plaster of Paris and predominantly a binder comprising calcium sulfate. "Gypsum" thus includes Plaster of Paris (non-hydrated) as present for example in the dry mix prior to water addition, as well as gypsum per se (hydrated Plaster of Paris). For example, the term "gypsum" also includes stucco, which is hemihydrated calcium sulfate, as well as fully hydrated calcium sulfate. The phrase "gypsum-based binder (or binder component)," will refer to the total binder used, such as gypsum mixed with minor amounts of Portland Cement (e.g., more gypsum than cement or other binder).

In exemplary gypsum-based fireproofing compositions of the present invention, therefore, the total amount of the binder component used may be in the range of 25–95% based on dry total weight of solids in the composition, more preferably at least 30–90% by weight, and most preferably at least 60–85% by weight of total solids in the composition.

The present invention derives from the surprising discovery that a set retarder, which can comprise either (a) a synthetic set retarding agent selected from a hydroxycarboxylic acid or a salt or derivative thereof, a polycarboxylic acid or a salt or derivative thereof, or a phosphoric acid or salt or derivative thereof; or (b) a proteinaceous set retarding agent in the amount of 0.4–7.5% based on the dry weight of total binder in the composition, can be successfully used in gypsum-based fireproofing compositions to delay setting for at least twenty four hours (e.g., overnight) or over 72–96 hours (e.g., weekend). This fireproofing composition is spray-applied with a conventional set accelerator such as aluminum sulfate (injected into the hose or nozzle) on a subsequent day, and nevertheless retains effectiveness as spray-applicable fireproofing.

Preferred set retarding agents of the invention may be in acid or salt form, such as sodium polyacrylic acid (in the slurry) or polyacrylate (in salt form in the powder); potassium polyacrylic acid or polyacrylate, and sodium phosphoric acid or (poly)phosphate. For achieving delayed-setting behavior, e.g., fluidity for at least 24 up to about 96 hours, a polyacrylic acid or its salt (such as sodium polyacrylate) can be used (at typical spray-application temperatures of 35°–150° F.) preferably in the amount of 0.1–4.5% based on the dry weight of binder in the fireproofing composition, or, if computed a percentage of total solids in the composition, in the amount of 0.1–1.5%, and more preferably 0.2–1.0%. For phosphoric acids or a salt, such as sodium polyphosphate, the preferred amounts may be roughly twice that of the polyacrylate since the polyphosphate are less effective as delayed-set retarders.

In other exemplary embodiments of the invention, the inventors have also surprisingly discovered that by doubling or even tripling the amount of proteinacious set retarder the setting of the gypsum based composition can be delayed to a point at least 24 hours or more. The proteinaceous set retarding agents should be used in the amount of 0.4–7.5%, more preferably 0.4–4.0%, based on dry weight of the binder in the fireproofing composition.

The present inventors had privately surmised that increased amounts of protein-based set retarding agent could be incorporated into gypsum-based fireproofing, but it was not until running laboratory testing on proteinaceous set retarding agents at high dosage levels that they appreciated the novelty of this approach. While one might think that delayed set retardation might be a natural consequence of adding a set retarder, the present inventors have confirmed that this would not be obvious in itself or even obvious to try in the context of spray-applied gypsum-based fireproofing, because there are numerous requirements for maintaining the effectiveness of a spray-applicable fireproofing composition. The composition needs to be mixed, pumped through long, narrow hoses using conventional fireproofing application equipment sometimes up 30 stories or more, and then injected with a set accelerator near or at the point of application. Thus, the present inventors had initially focused on the synthetic set retarders, which offer the advantage of avoiding staining and odor when compared to the use of proteinaceous set retarder, but realized that the achievement of delayed set (24 hour fluidity and longer) was indeed novel and inventive in the gypsum fireproofing art even with proteinaceous set retarding agents.

For the hydroxycarboxylic acid, polycarboxylic acid, and phosphoric acid-type set retarders as well, the present inventors believe that it would be difficult to make a routine selection of set retarders that would work for gypsum-based fireproofing that is to be mixed, pumped, and injected with a set accelerator during spray-application.

The present inventors find that there are numerous requirements for confirming that a particular set retarder that "works" to maintain the effectiveness of a gypsum-based fireproofing composition, such as (1) the fireproofing composition must not set for a desired extended duration; (2) the addition of the set retarder must not defeat the ability of the composition to entrain air and to maintain tiny air voids in the slurry in a stable manner (else it would not be pumpable in conventional fireproofing spray equipment); (3) the composition containing the set retarder must not exhibit segregation or swelling when left in hoses that are vertically disposed 5–30 stories or more; (4) the ability of the composition to be "woken up" or, in other words, capable of hanging on substrate surfaces (e.g., steel beams and panels) when injected during spray-application with convention set accelerators; and (5) the composition still allows foaming to occur (which enhances thermal insulative properties of the resultant fireproofing coating).

If segregation occurs, the segregated solids would tend to clog the hose and spray nozzle. If swelling (or expansion) of the mix composition occurred, there could also be clogging and, in the case wherein the density of the composition was decreased, the composition might be too "fluffy" to be pumped efficiently when in the slurry state.

It is to be observed that some commercially available gypsum (such as plasters or stucco binders) may have a minimal amount (usually much less than 0.4% based on weight of binder in the gypsum-based composition) of a proteinaceous set retarder (derived from animal byproducts) incorporated during manufacture. However, this amount of proteinaceous set retarder is not sufficient to delay the setting of the composition for 24 hours or more. For purposes of the present invention, the term "proteinaceous set retarding agent" shall mean and refer to a composition having at least 35–95% animal-based protein content (the rest being filler material or other additives).

Exemplary fireproofing compositions of the present invention may contain other additives and ingredients previously known in the art, e.g., air entraining agents, fibrous materials, and aggregate materials, so long as the fireproofing effectiveness of the composition is not defeated. The composition may further include hydraulic cements such as Portland cement (which is generally a mixture of lime, alumina, silica, and iron oxide), aluminous cement, or other non-gypsum cements, without detracting from the invention, so long as it is possible to use an injected set accelerator to resume spray-application of the carboxylic-acid-containing gypsum-based fireproofing composition of the present invention.

A preferred exemplary composition of the present invention comprises a gypsum binder, at least one lightweight aggregate, an air entraining agent, and a fibrous component.

The term "lightweight aggregate" as used herein means materials having a bulk density of 0.4–10.0 pounds per cubic foot (lbs/ft$^3$) or (6.4–160 kg/cubic meter), and this would include expanded vermiculite, expanded perlite, expanded clay prills, glass beads, mineral wool, shredded paper (such as newspaper), shredded expanded polystyrene, or a mixture thereof. The term "lightweight" is also used to distinguish the aggregates contemplated for use in the present invention herein from fine aggregates (e.g., sand) or coarse aggregates (e.g., gravel, stone) as used in the concrete arts (e.g., ready-mix concrete). Although the amount of lightweight aggregate can vary within wide limits, depending on the density of the aggregate, other materials present in the composition, and desired physical properties, the lightweight aggregate may be present in an amount of as little as 1% wt. to as much as 80% wt. or more based on the dry weight of total solids.

Shredded expanded polystyrene is a preferred lightweight aggregate because it has been found to have beneficial increases in fireproofing yield and adhesion to the metal substrate. Shredded newspapers also provide an exemplary lightweight aggregate material, which may be used alone or with any of the other lightweight aggregates mentioned above. A preferred fireproofing composition which is believed to be suitable for use in the present invention is disclosed, for example, in U.S. Pat. No. 4,751,024 of Larry Shu et al., which is incorporated fully by reference herein. Another suitable composition is disclosed in U.S. Pat. No. 4,904,503 of Dennis M. Hilton et al., also incorporated fully by reference herein. A suitable gypsum-based fireproofing composition, which is sold in dry form and mixed with water on the application site to obtain a sprayable slurry, is sold by Grace Construction Products, Cambridge, Mass., under the tradename MK-6®.

Exemplary compositions of the invention may further include air entraining agents for the purpose of increasing thickness or yield. For example, conventional air entraining agents include alpha olefin sulfonates or sodium lauryl-sulfonates. The air entraining agents may optionally, though preferably, be present in the fireproofing compositions of the invention in the amount of 0.1 to 0.4% dry wt based on total solids.

One advantage of the exemplary synthetic set retarding agents of the present invention is that they can help gypsum-based fireproofing compositions (when made into slurries) to obtain overnight "sleeping" (maintain fluid state) capabilities with dosages that are approximately one-fourth to one-third of that required by conventional proteinaceous set retarders when used in amounts sufficient to delay the setting of the fireproofing composition for an equal period of time. Also, the synthetic set retarders can be used in situations where the spray-applied fireproofing will be left exposed to viewing, because the hydroxycarboxylic acid, polycarboxylic acid, and phosphoric acid based set retarders, in contrast to the use of proteinacious set retarding agent, do not cause unpleasant odors or staining when incorporated into conventional gypsum-based fireproofing compositions. In contrast, when proteinaceous set retarders are used in the preferred amount of 0.4% and above (more preferably at least 1.0%) based on the weight of binder in the composition, it would be preferable to cover the fireproofing composition to hide the discoloration. Also, one may need to add a conventional odor suppressant, absorbent, or air freshener or masking agent into or onto the fireproofing composition or cover it up behind a wall or other visual barrier.

An exemplary method of the present invention comprises incorporating into a gypsum-based fireproofing composition, comprising at least one lightweight aggregate and optionally other additives as described above, a synthetic or proteinaceous set retarding agent in an amount effective to delay the setting of the composition for at least 24 hours. Further steps include injecting said composition during spray-application onto a substrate, with a set accelerator, such as an alum set accelerator material as is known in the fireproofing arts. The preferred set retarding agent for this use is sodium polyacrylate, preferably used in an amount of about at least 0.1% based on dry weight of binder in the fireproofing composition.

A further exemplary method of the present invention allows for the operator to employ the above-described novel gypsum-based fireproofing composition when it is desired to avoid having to empty (purge) and clean (rinse) the spray equipment (e.g., pump, mixer, hoses, nozzle, etc.) on a job requiring more than one day to complete. For example, the operator can employ conventional spray application equipment and a conventional gypsum-based fireproofing formulation (one having a proteinaceous set retarding agent in the amount of 0.2–0.25% based on the dry weight of the binder in the gypsum-based composition); and, at the end of the day, substitute for the usual proteinaceous set retarder either (1) an increased amount of proteinaceous set retarder 0.4–7.5% based on weight of binder in the composition; or (2) a synthetic set retarding agent selected from a hydroxycarboxylic acid or a salt or derivative thereof, a polycarboxylic acid or a salt or derivative thereof, or a phosphoric acid or salt or derivative thereof. The spray equipment can then be simply shut down, and the fireproofing composition be allowed to "sleep" in the mixer and hose(s) without fear that it will harden and plug up the spray equipment. On the next day (or Monday following the weekend), the operator can then immediately resume application (using injected set accelerator) of the fireproofing, and optionally switch back to the conventional fireproofing composition of step (1).

A colorant, dye, or pigment can optionally be used in the fireproofing composition having the delayed-setting retarding agent so that an operator can detect visually when it has completely replaced the conventional formulation in the mix equipment (and hose and nozzle) and can consequently shut down the spray equipment overnight or perhaps even over the weekend.

Thus, a further exemplary method of the invention comprises (1) spray applying through a mixer and hose a first fireproofing composition having a proteinaceous set retarding agent in an amount of 0.2–0.25% dry wt. (based on the weight of gypsum in the composition) and a lightweight aggregate; and (2) introducing into the same mixer and same hose a second gypsum-based fireproofing composition (which differs from the first by) comprising a set retarding agent comprising a hydroxycarboxylic acid, a polycarboxylic acid, a phosphoric acid, or salt or derivative thereof, or a proteinaceous set retarder in an amount of 0.4%–7.5% based on the dry weight of binder in the composition; and at least one light-weight aggregate, preferably in the range of 1–80%, by dry weight of the composition. Preferably, the set retarder in step (2) comprises a derivative (e.g., salt) of an acrylic acid, such as sodium or potassium polyacrylate. Another preferred set retarder for step (2) is sodium polyphosphate. The spray equipment can then be shut down overnight or over the weekend. On a subsequent day, the operator can then resume spray application using a set accelerator, such as aluminum sulfate, injected into the hose or nozzle, as is conventionally known. Preferably, the second fireproofing composition has a different color than the first fireproofing composition, so that an operator of the spray equipment can visually detect when the second composition has completely replaced the first composition in the spray equipment. The different coloration may be achieved using a colorant, dye, or pigment, and this enables the operator to ascertain visually that the second fireproofing composition has completely filled the mixer and hoses, so that the spray-application equipment can then be shut off without fear that the composition will harden in and clog the equipment. An exemplary colorant, dye, or pigment can include phthalocyanine blue, such as that available from ROMA Color, Inc., Fall River, Mass. Alternative, a colorant sold under the name STRAIT-LINE™ is available from American Tool Companies, Inc., of Wilmington, Ohio. On the following day (or day following a weekend or holiday), the second fireproofing (slurry) composition, which is "sleeping" in the mixer and hoses, can then be spray applied (e.g., in combination with an injected set accelerator) into the slurry composition in accordance with known methods (e.g., spray-application methods as may be described in U.S. Pat. Nos. 4,904,503; 4,934,596; or 5,520,332, incorporated by reference herein).

In further exemplary methods, the operator can revert to the first fireproofing composition (used in step (a)), which is possibly less expensive and has a faster setting characteristic, to minimize costs on the remaining project. The use of the novel synthetic set retarding agent, comprising a derivative of acrylic acid (with optional colorant, dye, or pigment), thus saves labor and material costs while avoiding waste.

In still further exemplary compositions and methods of the invention, the inventors contemplate that the delayed-set retarders of the invention, comprising a hydroxycarboxylic acid, a polycarboxylic acid, a phosphoric acid (or a salt or derivative thereof), or even 0.4–7.5% (based on dry weight binder) of proteinaceous set retarder can be packaged with an optional dye, colorant, or pigment, and introduced into the gypsum-based fireproofing composition at the application site. Thus, the polyacrylate, for example, and colorant can be packaged in a water-soluble or non-water-soluble (e.g., kraft paper) container that can be opened or directly thrown into the mixer; or it can be provided in the form of a flowable liquid in a container such as a bottle or box that can be opened and poured into the mixer at the application site.

In still further embodiments, a conventional gypsum-based fireproofing composition can be sold in powder form (comprising a gypsum binder, at least one lightweight aggregate in one or more bags, along with a separately packaged delayed-set retarder (with optional colorant, dye, or pigment) as part of a package system wherein the delayed-set retarder (e.g., sodium (poly)acrylate, sodium (poly)phosphate) can be properly dosed and introduced into the fireproofing composition when the operator desires to shut down the spray equipment until a subsequent day.

Exemplary methods of the invention therefore comprise spray applying a conventional gypsum-based fireproofing composition, which contains typical amounts (0.2–0.25% based on wt binder component) of a proteinaceous set retarding agent; and thereafter introducing into this composition a synthetic set retarding agent (e.g., sodium polyacrylate, sodium polyphosphate) or a proteinaceous set retarding agent in an amount of 0.4–4.0% based on weight of binder) in an amount sufficient to cause the composition to resist hardening in the pump and spray equipment for at least 24 hours.

The following examples are set forth for illustrative purposes only and not to limit the scope of the invention.

EXAMPLE 1

A comparative testing of a conventional fireproofing composition with the novel composition of the present invention reveals superior performance in the achievement of set retarding capabilities. A conventional fireproofing composition can be made by combining gypsum (e.g., 25–95% by total dry weight solids), a light weight aggregate such as shredded expanded polystyrene (about 0.5–4% by weight), an air entrainer (many conventional foaming surfactants will work), shredded newspaper as another light weight aggregate (about 1–6% by weight), and a set retarder comprising a proteinaceous set retarder (about 0.2–0.25% by weight binder). For example, a commercially available proteinaceous set retarder is available from National Gypsum under the tradename REDTOP®.

A second fireproofing composition can made similar to the one above except that sodium polyacrylate in the amount of 0.1–2.0% dry wt based on binder is substituted for the proteinaceous set retarder just mentioned.

The first and second compositions are each separately applied and evaluated by placing the composition into a mixer (which can be a paddle, ribbon, continuous, or batch type mixer), then pumped through 25–100 feet or more of hose, approximately three-quarters to three inches thick, injected with an aluminum sulfate set accelerator, and sprayed through a compress-air powered spray nozzle onto a steel substrate. It will be observed in comparison of these sprayable fireproofing compositions that the second composition having the sodium polyacrylate can remain fluid (e.g., "sleep") in the mixer and hoses for one to three days or more and yet be spray-applied with injection of the aluminum sulfate and still have fireproofing performance. On the other hand, the first composition having the proteinaceous set retarder will harden in the mixer and hose, and would otherwise need to be purged and rinsed from the spray equipment if the spray equipment is to be shut down overnight.

EXAMPLE 2

For present purposes, chemicals will not be considered useful delayed-set retarding agents for gypsum-based fireproofing compositions if they do not maintain a sufficiently fluid slurry (vicat of 12 or greater, See ASTM 472-93) after at least 72 hours after being mixed with water to form the spray-applicable slurry.

The following chemical components were mixed into standard gypsum-based fireproofing compositions and tested at 70° F. in plastic sample cups (which are sealed to prevent water evaporation), and their relative success as delayed-set retarders (which both extended the delay of setting and which permitted foaming and setting when combined with a conventional set accelerator such as aluminum sulfate) were noted in Table 1 below. The amount of each chemical component, based on the total dry weight of the fireproofing composition, is also noted.

TABLE 1

| CHEMICAL | Delay set | Amount | Mol. Wt. | Foam/set |
|---|---|---|---|---|
| Sodium polyacrylate | Yes | 0.25% | 2,100 | Yes |
| Protein retarder | Yes | 0.5% | | Yes |
| Acrylic add/maleic acid copolymer | Yes | 0.5% | 3,000 | Yes |
| Polyacrylate copolymer | Yes | 0.25% | 4,000 | Yes |
| Sodium polyphosphate | Yes | 0.50% | | Yes |
| Sodium polyacrylate | Yes | 0.50% | 1,200 | Yes |
| Sodium polyacrylate | | | | |
| Polyacrylic acid | Yes | 0.50% | 5,000 | Yes |
| Sodium polyacrylate | No | 0.50% | 15,000 | |
| Sodium polymethacrylate | No | 0.50% | 20,000 | |
| Sodium polyacrylate | No | 0.50% | 30,000 | |
| Sodium polyacrylate | No | 2.00% | 30,000 | |
| Sodium polyacrylate/maleic acid copolymer | No | 0.50% | 50,000 | |
| Sodium polyacrylate/maleic acid copolymer | No | 0.50% | 70,000 | |
| Polyacrylic acid | No | 0.50% | 450,000 | |
| Polyacrylic acid | No | 0.50% | 450,000 | |
| Gluconic acid | No | 2.0% | | |
| Styrene maleic anhydride | No | 2.0 | | |
| Borax | No | 2.0% | | |
| Urea | No | 2.0% | | |
| Lignosulfonate | No | 1.0% | | |
| Carboxylated polyether | No | 1.0% | | |
| Malic acid | No | 2.0% | | |
| Tartaric acid | No | 2.0% | | |
| 2-aminoterephthalic acid | No | 2.0% | | |
| Calcium phosphate monobasic | No | 2.0% | | |
| Sodium FDTA | No | 2.0% | | |
| Sodium citrate | No | 10.0% | | |

The foregoing data suggests that the inventive selection of set retarders for delaying the set of gypsum-based fireproofing compositions for 72 hours is not a matter of routine experimentation.

EXAMPLE 3

A further test was done, using a fireproofing composition comprising gypsum (25–90 wt % total solids), light weight aggregates (1–50 wt % total solids), and water. Conventional set retarding agents were used to demonstrate the surprising fact that there is not a linear correlation between the amount of set retarding agent used and the duration of time before which the gypsum-based fireproofing composition is set. In fact, it was discovered that at higher concentrations, some of the conventional set retarders were extremely detrimental to the fireproofing composition.

Conventionally known set retarders included borax, sodium EDTA, sodium citrate, and tartaric acid. Gluconic acid and malic acid were also tested with this group of known gypsum retarding agents because these had carboxylic acid groups.

At 2% (by wt of fireproofing composition), borax, a known set retarder for gypsum, was not effective to delay the setting of the fireproofing composition. At 10%, the borax did delay the setting of the composition, but the volume of the fluid composition shrunk due to air instability. Also, a salt film was formed on the surface of the composition during the drying of the composition, and this would lead to poor appearance of the fireproofing composition, dusting of the product, and decreased cohesive strength.

At 2%, sodium EDTA does not delay the set retardation of the gypsum composition more than 24 hours. When this amount is increased to 10% by wt of the composition, the composition nevertheless also set in less than 72 hours. The composition was observed to increase in volume, suggesting that the increased amount of the set retarder created foam.

This would not be pumpable. Volume increases such as this could lead to burst hoses during spray application.

Sodium citrate is also a known gypsum set retarder. When this was used in the amount of 10% by weight of the composition, the composition set in less than 72 hours. A salt layer was also formed during drying of the composition.

Tartaric acid is a known gypsum set retarder which resulted in an extremely detrimental expansion of the composition when this set retarder was used at 10% by weight. The composition set in less than 72 hours, and also demonstrated large air voids which would decrease the cohesive strength of the fireproofing.

Testing was done using gluconic acid which is a known cement set retarder. The sample also set in less than 72 hours, and resulted in a composition which expanded in volume, had large air voids, and had a salt layer.

Malic acid was observed to cause the gypsum fireproofing composition to set in less than 72 hours and also caused the composition to shrink. The air became unstable and collapsed. This would not give rise to a pumpable fireproofing composition.

Therefore, the foregoing set retarders demonstrated that it would not be obvious to modifying gypsum fireproofing compositions to achieve a delayed-set characteristic, while maintaining desirable fireproofing properties, simply by interchanging and/or modifying the set retarders.

In contrast, the use of sodium polyacrylate in the amount of about 0.25% by weight of the binder and the use of a proteinaceous set retarder in the amount of 1% by weight of the binder did not cause the fireproofing composition to expand or shrink, and demonstrated the ability to postpone setting until after 72 hours; and, further, they did not cause large air voids or salt layers (visible as a whitish film) on the fireproofing composition. Accordingly, an exemplary feature of inventive fireproofing compositions of the invention having delayed-set retarders is that they provide fireproofing effectiveness without swelling or shrinking in volume and without formation of a salt layer or whitish layer.

The foregoing discussion and examples were provided for illustrative purposes and not intended to limit the scope of the invention as claimed.

We claim:

1. A fireproofing composition for a spray-applicable fireproofing slurry using a mixer, pump, hose, and spray-nozzle, said fireproofing composition comprising:

a gypsum binder in the amount of 25–95% based on total dry solids in the fireproofing composition;

at least one lightweight aggregate having a bulk density of 0.4–10 pounds per cubic foot, said at least one lightweight aggregate comprising expanded vermiculite, expanded perlite, expanded clay prills, glass beads, mineral wool, shredded paper, shredded expanded polystyrene, or mixture thereof, said at least one lightweight aggregate being present in an amount of 1–80% based on dry weight of solids in the fireproofing composition;

an air entraining agent operative to entrain air of a stable nature in the composition when water is added to form a slurry to allow the composition to be pumped through hoses;

a synthetic set retarding agent present in the fireproofing composition in an amount operative, when the fireproofing composition is made into a spray-applicable slurry and pumped through the hose and spray-nozzle at spray application temperatures of 35°–150° F., to delay setting of the fireproofing composition for at least 24 hours, said synthetic set retarding agent comprising polyacrylic acid or a salt or derivative thereof in the amount of 0.1–4.5% or a phosphoric acid or salt or derivative thereof in the amount of 0.2–9.0%, all percentages based on dry weight of said binder in the fireproofing composition, and said synthetic set retarding agent having a molecular weight between 1000–15,000.

2. The fireproofing composition of claim 1 wherein said composition is mixed with water to obtain a slurry fluidity of at least vicat 12 according to ASTM 472-93 for at least 72 hours after being mixed with water, said fireproofing composition thereby being operative to remain dormant for at least 72–96 hours within the hose and nozzle, after which period said composition is spray-applicable onto metal structural members and substrates using set accelerator fluid injected into the hose or nozzle.

3. The fireproofing composition of claim 1 wherein said synthetic set retarding agent is sodium polyacrylate, potassium polyacrylate, a polyacrylic acid formed from sodium polyacrylate, a polyacrylic acid formed from a potassium polyacrylate, or mixture thereof.

4. The fireproofing composition of claim 3 wherein said synthetic set retarding agent is sodium polyacrylate.

5. The fireproofing composition of claim 4 wherein said sodium polyacrylate is present in the amount of 0.1–2.0% by dry weight of said binder.

6. The fireproofing composition of claim 1 wherein said synthetic set retarding agent comprises a phosphoric acid or salt.

7. The fireproofing composition of claim 6 wherein said set retarding agent comprises sodium phosphoric acid or sodium (poly)phosphate.

8. The fireproofing composition of claim 1 wherein said lightweight aggregate comprises shredded expanded polystyrene.

9. The fireproofing composition of claim 1 wherein said lightweight aggregate further comprises shredded paper.

10. The fireproofing composition of claim 1 wherein said lightweight aggregate comprises expanded vermiculite.

11. The fireproofing composition of claim 1 wherein said binder further comprises Portland cement.

12. The fireproofing composition of claim 1 further comprising a colorant, dye, or pigment operative to color said fireproofing composition, whereby an operator of the mixer, hose, and spray-nozzle is enabled to visually perceive when the colored fireproofing composition has displaced in the mixer, hose, and spray-nozzle another fireproofing composition having a different color.

13. The fireproofing composition of claim 1 wherein said air entraining agent is present in the amount of 0.1–0.4% by dry weight based on total solids in the composition.

14. The fireproofing composition of claim 13 wherein said air entraining agent is alpha olefin sulfonate.

15. The fireproofing composition of claim 13 wherein said air entraining agent is sodium lauryl-sulfonate.

16. The fireproofing composition of claim 1 wherein said set retarding agent is present in an amount effective to delay the setting of said composition for 72–96 hours without causing the composition to swell or shrink or to cause a salt layer to form on the composition when it is spray-applied.

17. The fireproofing composition of claim 2 further containing aluminum sulfate injected into said composition during spray-application of said composition.

18. A fireproofing composition system comprising a first fireproofing composition contained in a first package, said first fireproofing composition comprising a gypsum binder and a proteinaceous set retarding agent derived from animal byproduct, said proteinaceous set retarding agent being present in an amount less than 0.4% based on weight of said binder; and a second fireproofing composition as described in claim 1 said second fireproofing composition being contained in a second package.

19. The fireproofing composition system of claim 18 wherein said second fireproofing composition has a different color than said first fireproofing composition, thereby allowing an applicator to distinguish visually between said first and second fireproofing compositions during spray application.

20. The fireproofing composition system of claim 19 wherein said second fireproofing composition is packaged in a package operative to be dispersed and opened in a gypsum containing fireproofing slurry, whereby the contents may be released from the package and dispersed within the slurry.

21. The fireproofing composition system of claim 20 further comprising a packaged set accelerator.

22. A fireproofing composition for achieving a gypsum-based, spray-applicable fireproofing slurry using a mixer, pump, hose, and spray-nozzle, said fireproofing composition comprising:

a gypsum binder in the amount of 25–95% based on total dry solids in the fireproofing composition;

at least one lightweight aggregate having a bulk density of 0.4–10 pounds per cubic foot, said at least one lightweight aggregate comprising expanded vermiculite, expanded perlite, expanded clay prills, glass beads, mineral wool, shredded paper, shredded expanded polystyrene, or mixture thereof, said at least one lightweight aggregate being present in an amount of 1–80% based on dry weight of solids in the fireproofing composition;

an air entraining agent operative to entrain air of a stable nature in the composition, when water is added to form a slurry, to allow the composition to be pumped through fireproofing spray equipment; and a proteinaceous set retarding agent derived from animal byproduct and present in said fireproofing composition in an amount operative, when the fireproofing composition is made into a spray-applicable slurry and pumped through the hose and spray-nozzle at spray application temperatures of 35°–150° F., to delay setting of the fireproofing composition for at least 24 hours, said set retarding agent being present in the amount of 0.4–7.5% based on dry weight of said binder.

23. The fireproofing composition of claim 22 wherein said composition is mixed with water to obtain a slurry fluidity of at least vicat 12 according to ASTM 472-93 for at least 72 hours after being mixed with water, said fireproofing composition thereby being operative to remain dormant for at least 72–96 hours within the hose and nozzle, after which period said composition is spray-applicable onto metal structural members and substrates using set accelerator fluid injected into the hose or nozzle.

24. The fireproofing composition of claim 22 wherein said lightweight aggregate comprises shredded expanded polystyrene.

25. The fireproofing composition of claim 22 wherein said lightweight aggregate further comprises shredded paper.

26. The fireproofing composition of claim 22 wherein said lightweight aggregate comprises expanded vermiculite.

27. The fireproofing composition of claim 22 wherein said binder further comprises Portland cement.

28. The fireproofing composition of claim 22 further comprising a colorant, dye, or pigment operative to color said fireproofing composition, whereby an operator of the mixer, hose, and spray-nozzle is enabled to visually perceive when the colored fireproofing composition has displaced in the mixer, hose, and spray-nozzle another fireproofing composition having a different color.

29. The fireproofing composition of claim 22 wherein said air entraining agent is present in the amount of 0.1–0.4% by dry weight based on total solids in the composition.

30. The fireproofing composition of claim 22 wherein said air entraining agent is alpha olefin sulfonate.

31. The fireproofing composition of claim 22 wherein said air entraining agent is sodium lauryl-sulfonate.

32. The fireproofing composition of claim 22 wherein said set retarding agent is present in an amount effective to delay the setting of said composition for at least 72–96 hours without causing the composition to swell or shrink or to cause a salt layer to form on the composition when it is spray-applied.

33. The fireproofing composition of claim 22 further containing aluminum sulfate injected into said composition during spray-application of said composition.

34. A fireproofing composition system comprising a first fireproofing composition contained in a first package, said first fireproofing composition comprising a gypsum binder and a proteinaceous set retarding agent derived from animal byproduct, said proteinaceous set retarding agent being present in an amount less than 0.4% based on weight of said binder; and a second fireproofing composition as described in claim 22, said second fireproofing composition being contained in a second package.

35. The fireproofing composition system of claim 34 wherein said second fireproofing composition has a different color than said first fireproofing composition, thereby allowing an applicator to distinguish visually between said first and second fireproofing compositions during spray application.

36. The fireproofing composition system of claim 35 wherein said second fireproofing composition is packaged in a package operative to be dispersed and opened in a gypsum containing fireproofing slurry, whereby the contents may be released from the package and dispersed within the slurry.

37. The fireproofing composition system of claim 32 further comprising a set accelerator.

38. The fireproofing composition of claim 22 further comprising an absorbent operative to absorb odors from said set retarding agent.

* * * * *